United States Patent [19]

Robinson, Sr.

[11] 3,883,887

[45] May 13, 1975

[54] METAL OXIDE SWITCHING ELEMENTS

[75] Inventor: Thomas L. Robinson, Sr., East Aurora, N.Y.

[73] Assignee: Astronics Corporation, East Aurora, N.Y.

[22] Filed: Feb. 9, 1973

[21] Appl. No.: 331,268

[52] U.S. Cl. .......................... 357/2; 357/6; 357/17; 357/45

[51] Int. Cl. ............................................ H01l 11/00

[58] Field of Search ..................................... 317/234

[56] References Cited

UNITED STATES PATENTS

| | | | |
|---|---|---|---|
| 3,271,591 | 9/1966 | Oushinsky | 317/234 |
| 3,550,155 | 12/1970 | De Rosa | 317/234 |
| 3,629,155 | 12/1971 | Kristensen | 317/234 |
| 3,764,566 | 10/1973 | Matsuoka et al. | 317/234 |

OTHER PUBLICATIONS

C. H. Sie, Theisis, May 1969, Iowa State Univ. Eng. Research Inst.

*Primary Examiner*—Michael J. Lynch
*Assistant Examiner*—E. Wojciechowicz
*Attorney, Agent, or Firm*—Shlesinger, Fitzsimmons & Shelsinger

[57] ABSTRACT

A bistable semi-conductor switch is produced by oxidizing the surface of a first metal electrode (e.g. by anodizing an aluminum conductor), and securing a second electrode against the surface of the metal oxide switching element (MOSE). An AC signal of proper amplitude will switch the electrodes into conducting mode; and they will stay in this mode until a DC signal of proper amplitude is applied thereacross to reset them. By varying the thickness of the oxide coating the value of the switching voltage can be varied. The elements can be employed for example, for selectively controlling illumination of electroluminescent lamps.

5 Claims, 17 Drawing Figures

METAL OXIDE SWITCHING ELEMENTS

This invention relates to electrical switching devices, and more particularly to solid state switching devices.

Various forms of crystalline semi-conductors have been employed heretofore for switching purposes in solid state circuits. The two terminal Diac switch is used to trigger other switching devices, such as Triacs. Because of their power dissipating current-voltage characteristics, however, Diacs are normally used only for momentary bilateral conduction in triggering applications. Silicon controlled rectifiers SCR's are three terminal switches that conduct current only in one direction and block current in the reverse direction. Once an SCR is triggered into its conduction mode, it will continue to conduct until its anode current is interrupted; after which it will revert to its high resistance, non-conducting state. The Triac, is also a three terminal switching device, but, unlike the SCR, it can conduct current in both directions. However, it also will revert to a high resistance or current blocking state, when the excitation current is removed. Typically, therefore, these crystalline-type semi-conductor switches are in a "stable" state only when they are in their high resistance or current blocking modes.

Still another type of solid state switching device is the amorphous semi-conductor. Amorphous semi-conductors are divided into two classes: (1). Chalcogenide glass ($Te_{40}$ $Si_{18}$ $Ge_7$ $As_{35}$) and; (2.) Transition metal oxide glass systems ($CuO$: $V_2O_2$: $P_2O_5$), or mixtures of $SiO_2$, $B_2O_3$, $P_2O_2$ with BaO, CaO, CdO and proportions of Fe, Cu, V, Co, W and Mn.

Two terminal switching devices made from chalcogenide glass are known as "Ovonic" switches. The glassy material is usually deposited in thin layers about one micron thick on a smooth conductive, or semi-conductive, substrate on which counter electrodes of Pt, Cu, Cr, Au or Al are also deposited.

Voltage and current handling capabilities of the chalcogenide glass two terminal switching devices seem to be limited to low levels, e.g. currents of about 0.100 amps, and voltages of less than 100. Furthermore, such switches are expensive.

Transition metal oxide glass switches have a maximum operating current capacity greater than Ovonic switches, but even so their capacity is less than one ampere.

Neither type of amorphous semi-conducting device, though, requires an exciting voltage or current, as do the crystalline semi-conductors, to hold or maintain it in its "on" or low resistance state.

One object of this invention is to provide an improved bistable switching element of the semi-conductor variety, which is substantially less expensive and easier to manufacture than known semi-conductor switches.

Still another object of this invention is to provide an improved, bistable, semi-conductor switch element which is capable of handling substantially greater operating currents and voltages than known semi-conductor switches of comparable size.

Another object of the invention is to provide a solid state switching element which can function for voltages and currents of all levels.

A further object of this invention is to provide an improved semi-conductor switching element which can be switched by a predetermined voltage to a low resistance or conducting mode, and which will remain indefinitely in this mode even when the switching voltage or current is removed.

Another object of this invention is to provide a bistable switch which can be switched from a stable non-conducting mode to a stable conducting mode by one type of signal, and which requires a different type of signal to return it to its non-conducting mode.

A further object of this invention is to provide improved electroluminescent devices incorporating switching elements made in accordance with this invention.

These and other objects of the invention are achieved by a switching device having a solid state metal oxide switching element hereinafter known as MOSE, fabricated, for example, from anodized aluminum, electrochemically grown aluminum oxide ($Al_2O_3$). The device has two stable states: one exhibits an "open circuit" resistance in the high megohm range, while the other state presents a "closed-circuit" resistance of fractions of an ohm. MOSE operation is bilateral and latching. An AC signal, or a pulsating DC voltage of proper amplitude, will cause the device to switch from its high resistance state and latch into a low resistance state, until reset. A low DC voltage of either polarity is used to reset or open the switch and latch it back into its high resistance or current blocking mode. A MOSE can be constructed from anodized aluminum wires, bars, or flat foil as well as from combinations of them. The electrodes at the aluminum oxide interface may be aluminum, copper, or some other conductor, e.g. conductive rubber. The MOSE element, in other words, can be used as one electrode of a switch whose other electrode is a copper, iron, nickel or other conductor.

The main differences between amorphous semi-conductive switches and a MOSE device lie in the composition, fabrication and operating levels. In one form the MOSE is composed of a single oxide, $Al_2O_3$, which can be formed electrochemically by well-known anodizing methods, thermally grown, or sputtered on a conductive surface. The simplest and least expensive fabricating method of making a switch of this type is to anodize an aluminum surface and apply the counter electrode by lamination or molding.

Operating levels of present MOSE units include switching voltages from millivolts to more than one thousand volts. An infinite range of voltages and currents may be switched by controlling the counter electrode area and the $Al_2O_3$ thickness. Moreover, as stated, once a MOSE device has been triggered into conduction, it is latched there, whereas a Triac, for instance, must be triggered for each and every half cycle of excitation voltage. A MOSE device has two stable latching states, while the Triac switch has only one stable state, being normally in the high resistance, non-conducting mode.

Various forms and applications of the metal oxide switching element and applications thereof are illustrated in the accompanying drawings, wherein.

Figure 1:
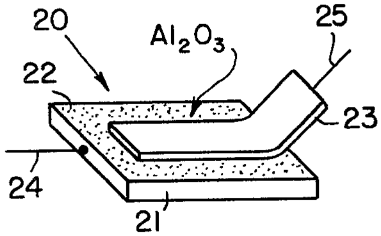
FIG. 1 is an orthographic view of a switch made according to one embodiment of this invention and incorporating a metal oxide switching element.

Referring now to the drawings by numerals of reference, and first in FIG. 1, 20 denotes one of the simplest forms of a metal oxide switching device comprising an anodized aluminum strip 21 having on at least one surface a film 22 of aluminum oxide ($Al_2O_3$). A second electrode, such as an electrically conductive strip 23 of copper, iron, or the like, is secured against the aluminum oxide surface 22. Conventional wire conductors 24 and 25 project, respectively, from the electrodes 21 and 23 for connecting switch 20 in an electric circuit.

Switch 20 has the property of being able to exist in two different stable modes, in one of which, its normal mode, it exhibits a relatively high ohmic resistance to the flow of current between its electrodes 21 and 23, and in the second of which it presents little or no resistance to such current flow. To switch the device 20 from its essentially non-conductive mode to its conductive mode, a pulsating excitation voltage must be applied across electrodes 21 and 23. When this voltage reaches a predetermined breakover or threshold value, switch 20 becomes conductive (in either direction) and remains so until it is reset to its non-conductive mode by the application thereto of a small DC signal, as noted above.

Figure 2:
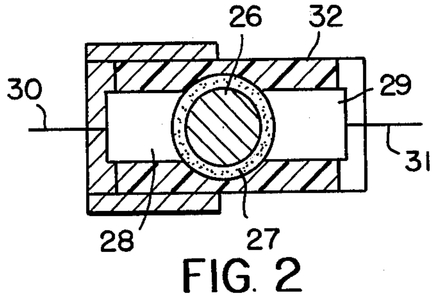
FIG. 2 is a sectional view showing another embodiment of switch made according to the invention.

FIG. 2 illustrates another embodiment of switch employing a MOSE. Here 26 designates an anodized aluminum sphere or bar whose aluminum oxide coating 27 is engaged at diametrally opposite areas by discreet copper electrodes 28 and 29 to which the electric wires or leads 30 and 31, respectively, are connected. The element 26 is housed in a dielectric molded shell 32. Here the portion of the aluminum oxide coating, which is contiguous with the electrode 28 is equivalent to one discreet and separate layer of oxide. The portion of the oxide coating which is contiguous with electrode 29 is equivalent to a separate layer of oxide. The area of the oxide coating 27, which is not contacted by electrodes 28 and 29 is not in the switching circuit.

The aluminum core 26 in FIG. 2 is "floating", and has no lead connection. When the oxide is in a conducting state, the aluminum core acts as a conductive bridge between electrodes 28 and 29. If a lead connection is made to aluminum core 26, then there would be two MOSE with 26 as the common terminal. This would be equivalent to connecting two MOSE, such as shown in FIG. 1, back to back. Note that only the area of oxide 27 directly in contact with the electrodes 28 and 29 will be effective in the switching action. No current flows circumferentially from electrode 28 through oxide film 27 to electrode 29, or vice versa. Current will flow only normally across the coating 27 from the contact areas of electrodes 28 and 29.

Figure 3:
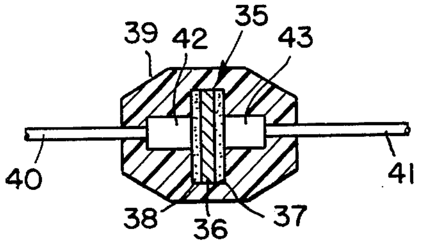
FIG. 3 is a longitudinal sectional view through a switch made according to still another embodiment of the invention.
Figure 3A:
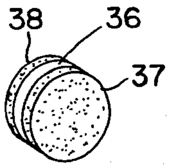
FIG. 3A is a perspective view of the MOSE which is incorporated in this switch.

FIG. 3 shows another embodiment of switch 35 embodying a MOSE. Here the MOSE consists of an anodized aluminum disc or pellet 36 anodized on both ends, as indicated at 37 and 38. Spaced electrodes 42 and 43 are in contact with the two anodized sides of the pellet, respectively. The pellet is encapsulated in a dielectric molded shell 39 and is connected at opposite sides to the electrodes 40 and 41.

In FIG. 3 there are two layers of oxide 37 and 38 with the aluminum core 36 between them. The structure of FIG. 3 is equivalent in switching action to that of FIG. 2. The difference lies only in the physical structure. In FIG. 2 the aluminum core 26 is a sphere anodized all over, while in FIG. 3 aluminum disc 36 is anodized on both sides. In FIG. 3, the current flow will also be normal to the contact surfaces on electrodes 40 and 41.

Figure 4:
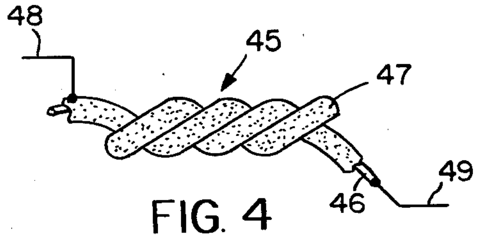
FIG. 4 is a side elevation of a further embodiment of switching device employing a MOSE.

FIG. 4 illustrates still another embodiment of switching device 45 comprising a copper wire 46 encased in an anodized aluminum sheath 47. Terminals 48 and 49 are connected to the sheath 47 and core 46, respectively.

Figure 5:
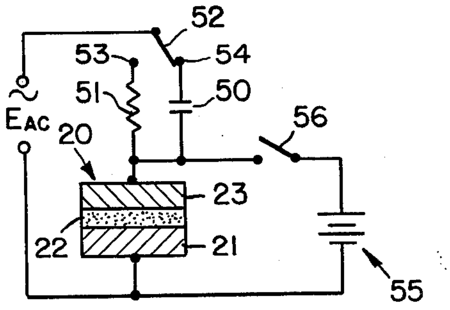
FIG. 5 is a diagrammatic view, showing a basic switching circuit with an electroluminescent lamp (EL) as the load, connected in series with a MOSE device, and how the device may be triggered to its low-resistance state, and also how it may be reset.
Figures 6, 7:
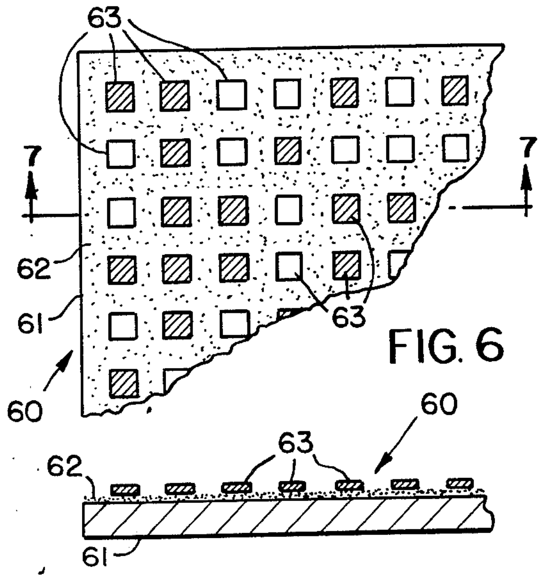
FIG. 6 is a fragmentary plan view of a memory plate or plane in which a plurality of metal oxide switching devices have been incorporated according to a further embodiment of this invention.
FIG. 7 is an enlarged, fragmentary sectional view on the line 7—7 in FIG. 6 looking in the direction of the arrows.
Figure 8:
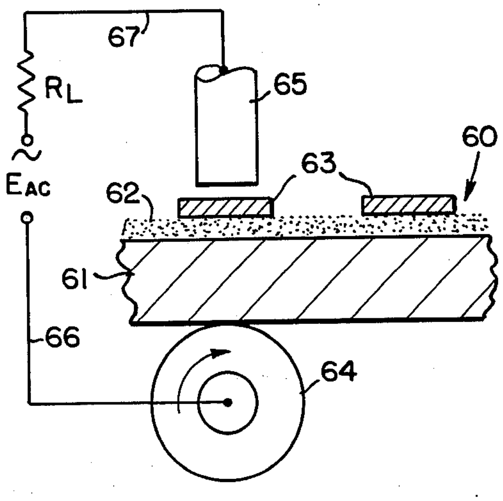
FIG. 8 illustrates diagrammatically one form of electrical readout apparatus in which a memory plate or plane of this type can be incorporated.

By way of example, FIG. 5 illustrates the basic switching circuit with a MOSE, such as switching element 21 – 22, selectively connected by switch 52 in series with a load 50, such as an electroluminescent lamp, or with a resistance 51, across an AC power source $E_{AC}$. Assuming that the switch 20 is initially in "reset" (the high-resistance) state, switch 52 is moved to engage contact 53 and the AC triggering voltage is increased until the "break-over" voltage level is reached, whereupon the MOSE switches to its low-resistance state. The triggering circuit includes the resistance 51 and the switch 52. When the switch 52 is engaged with the contact 53 the AC voltage drops across resistance 51, when the MOSE conducts.

When the MOSE is in its low-resistance state, switch 52 is shifted to make contact at 54 and virtually all of the voltage $E_{AC}$ appears across the EL lamp 50, thus lighting it. The EL lamp is now latched "ON" by the MOSE and will remain so until the excitation voltage is removed by opening switch 52. However, the lamp will re-light when the excitation voltage is restored. The "memory" of the MOSE in other words is non-destructive; so that the excitation voltage may be turned on and off without destroying the stable "latched-on" state of MOSE.

In order to erase the MOSE latched-on memory, excitation voltage must be interrupted, and a low DC voltage, such as produced by battery 55 must be sent through the terminals of the MOSE to reset the switch 20. For this purpose the switch 56 is closed. If the excitation voltage is again applied, while the MOSE is in its reset state, the EL lamp will not light because now the MOSE is in its stable "latched-off" condition. In order for it to conduct again to relight the lamp, the MOSE must again be returned to its low-resistance state through energization of the triggering circuit 51-52. The MOSE can be reset without interrupting the excitation source if the amplitude across the load and switch (in series) is at any level lower than the breakover voltage.

In FIGS. 6 to 8, 60 denotes a multi-terminal switching element or memory plane comprising an anodized aluminum plate 61 having on its face a film 62 of aluminum oxide. In this embodiment a plurality of relatively small, rectangular electrodes 63, each of which may be made of copper or other conductive metal, are fastened in spaced rows and columns on the oxide film 62.

For imparting and creating the high density, non-destructive memory plane, element 60 may be mounted to slide or roll on an electrode or conductor 65 (FIG. 8), with its electrodes 63 located beneath a vertically-disposed pick-up probe 65, which is also made electrically conductive. One side of an alternating current power supply $E_{AC}$ is connected by conductor 66 to the rotatable electrode 64, and the opposite side is connected through a load resistance $R_L$ and conductor 67 with the probe 65.

In use the element 60 may be shifted on electrode 64 to position its upper electrodes 63 one after another beneath the probe 65, thereby to apply the exciting voltage $E_{AC}$ across both the electrode 61 and the particular electrode 63 then in registry with the probe 65. Each electrode 63, electrode 61 and its oxide film 62, then represent a separate switch, which will be rendered conductive only when the necessary breakover voltage is applied thereacross by the probe 65 and conductor 64. Only the portion of the aluminum oxide film 62 beneath a respective electrode 63 is switched to a conducting mode when the necessary breakover voltage is applied, so that there is no shorting between adjacent electrodes 63. Therefore, each rectangular electrode 63 and the registering portions of the underlying aluminum oxide and strip 61 constitute a separate switching element which can be selectively latched into conducting or non-conducting mode by the probe circuit.

Figure 9:
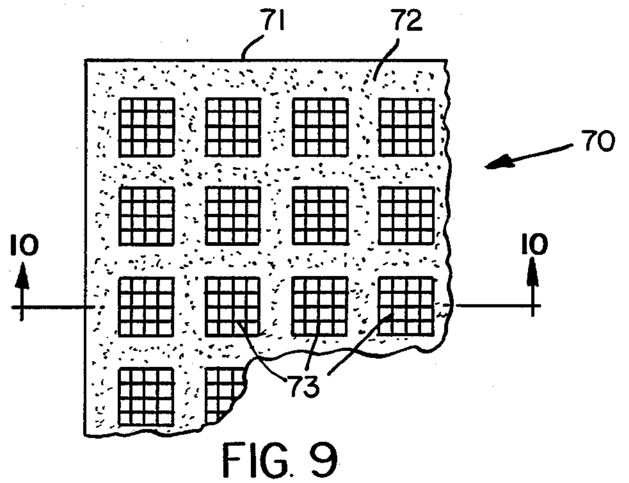
FIG. 9 is a fragmentary plan view of a modified form of memory plane.
Figure 10:
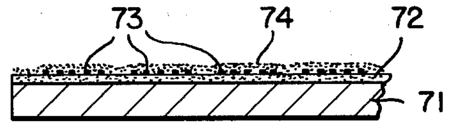
FIG. 10 is a fragmentary sectional view of this modified memory plane taken on line 10—10 in FIG. 9 looking in the direction of the arrows.
Figure 11:
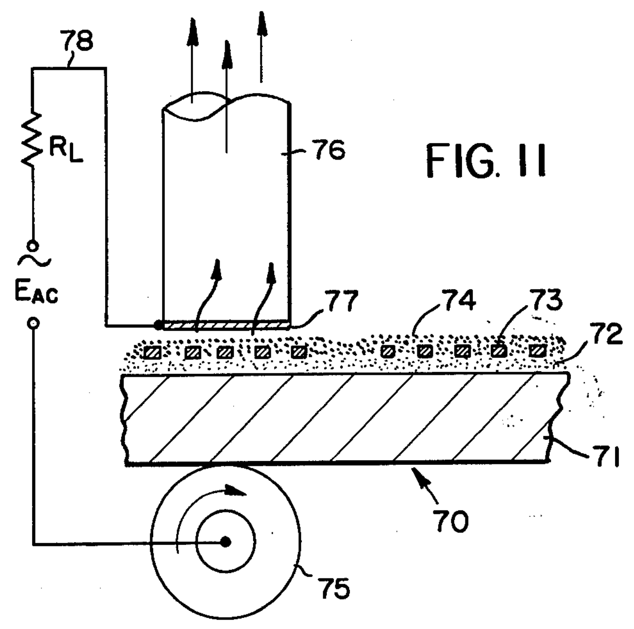
FIG. 11 illustrates diagrammatically one form of optical readout apparatus that may be employed with this modified memory plane.

In the multi-switching element 70 illustrated in FIGS. 9 to 11, a plurality of rectangularly-shaped wire screens or grids 73 are secured in spaced rows and columns on the anodized face 72 of an aluminum plate 71. As shown more clearly in FIG. 11, each grid 73 is coated or covered with a layer 74 of electroluminescent phosphor material of the type disclosed, for example, in U.S. Pat. No. 3,531,676. As in the preceeding embodiment, the element 70 may be mounted for movement on a rotatable electrode 75, which is connected in circuit with a probe 76 that is positioned to overlie the upper surface of element 70. In this embodiment the probe 76 may comprise a glass light pipe having on its lower end a transparent, $SnO_2$ conductive probe plate or point 77, which is connected, as in the previous embodiment, by a conductor 78 through a load resistance $R_L$ to one side of the excitation voltage $E_{AC}$. The upper end of pipe 76 may be directed, for example, onto a photo-sensitive pick-up device, not illustrated. This apparatus forms an optical readout in which each of several individual switching elements is represented by a coated grid 73, and the registering portions of the underlying aluminum oxide film 72 and aluminum substrate 71. Whenever the energized probe 76 moves into registry with a respective grid 73, and whenever the exciting voltage $E_{AC}$ exceeds, or has previously exceeded, the threshold voltage of this portion of element 70, the electroluminescent material 74 surrounding the selected grid will be excited and will therefore glow and convey light through the pipe 76 to the associated pick-up device.

Figure 12:
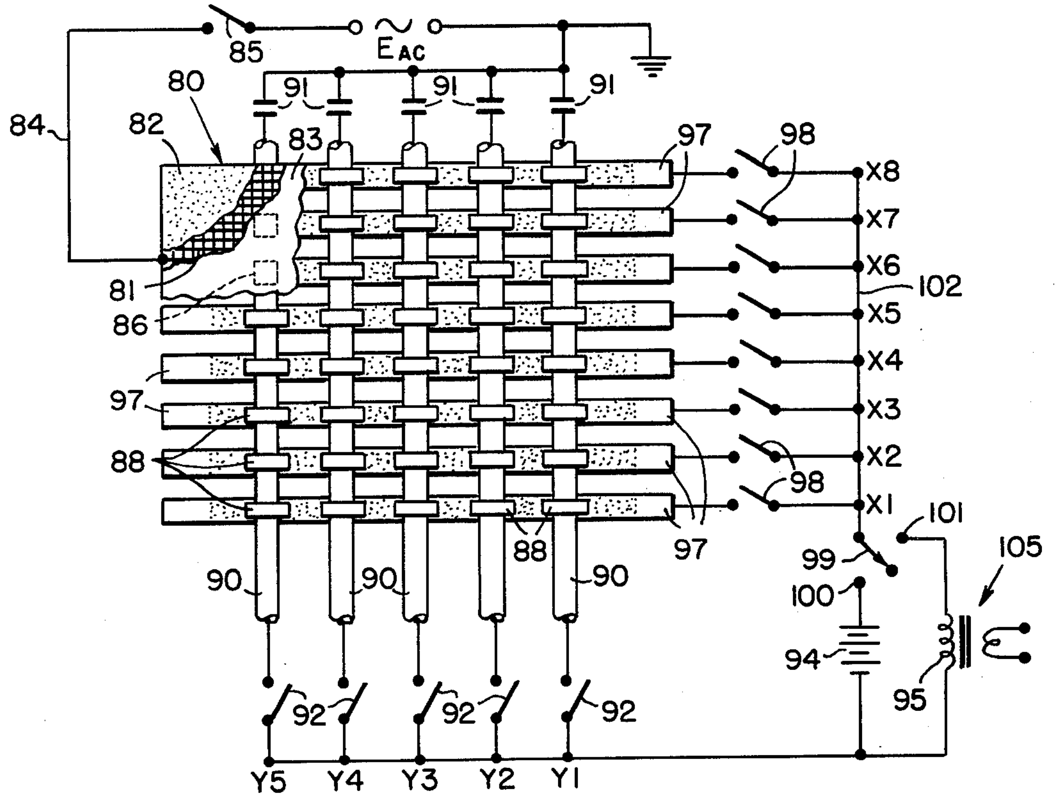
FIG. 12 is a schematic plan view of an electroluminescent display incorporating switching elements made in accordance with another embodiment of this invention, portions of the display being cut away for purposes of illustration.
Figure 13:
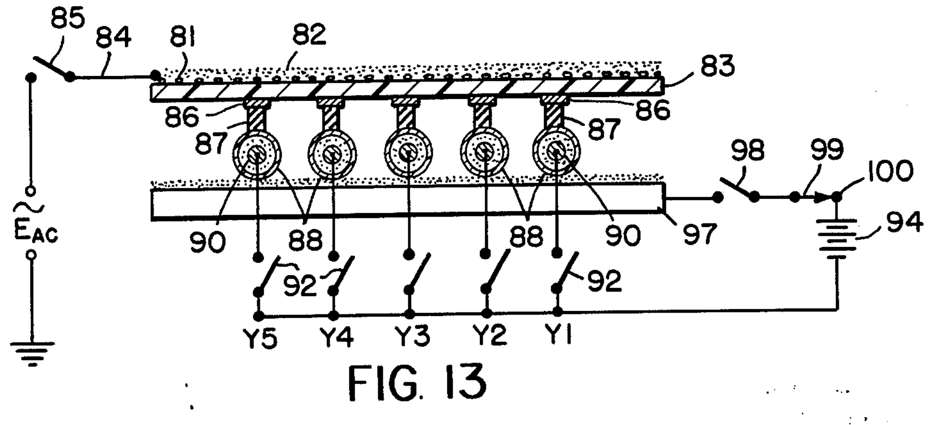
FIG. 13 is a diagrammatic sectional view taken on a vertical plane through the display of FIG. 12.

FIGS. 12 and 13 illustrate an X-Y display matrix 80 comprising a grid 81 which is coated with an electroluminescent material 82 in a manner similar to the grids employed in the preceeding embodiment. Grid 81 is secured on a layer 83 of dielectric insulation, and is connected by a conductor 84 to one side of a manually operable switch 85, the opposite side of which is connected through an alternating current power source $E_{AC}$ to ground. Insulating layer 83 is supported on a plurality of rectangular metal plates or back electrodes 86 which are secured in spaced rows and columns to the back of the insulating layer. These plates are supported by electrically conductive rubber pads 87 on a plurality of copper rings 88, that are secured in axially spaced relation on spaced, parallel anodized aluminum wire conductors 90, which extend in registry with the columns of back electrodes 86. At one end each conductor 90 is connected through a coupling capacitor 91 (FIG. 12) to ground, and at its opposite end is connectable through a normally open, manually operable switch 92 to one side of a battery or DC voltage supply 94, and to one end of coil 95 of a transformer 105.

The wires 90 are supported by their rings 88 on, and at right angles to, a plurality of spaced, parallel, anodized aluminum strips or conductors 97, which are disposed beneath and in registry with the rows of back electrodes 86. Each conductor 97 is connected at one end through a normally-open switch 98 to a line 102, which in turn is connected through a manually operable selector switch 99 selectively with the terminal 100 of battery 94 or the terminal 101 of the triggering transformer coil 95.

In use, various portions of the matrix 80 may be energized to cause selected portions of the electroluminescent material 82 to glow.

Assuming that the MOSE devices are in their reset conditions, the first step is to move the selector switch 99 from its neutral position into engagement with contact 101 of the secondary 95 of transformer 105 to connect this coil to one side of each of the selector switches 92 and 98. The selector switches 92 and 98 are closed selectively to apply this AC triggering voltage across the metal oxide switching elements associated with those portions of matrix 80 that are to be energized. For example, by closing switch 98 at the row X3, and switch 92 in column Y1, the AC voltage from coil 95 will switch the registering portions of the aluminum oxide films on the associated conductors 90 and 97 to their low resistance or conducting modes, so that at the point where these two conductors intersect, the conductors will be disposed in electrically conducting relationship to the associated ring 88, pad 87, and back electrode 86.

After the desired metal oxide switching elements have thus been latched into their conducting modes, the selector switch 99 may be swung back to its neutral position; and switch 85 is closed. However, only those portions of the grid 81 whose associated back electrodes 86 have been switched to conducting states will become illuminated; and the non-selected portions of the grid matrix will remain deenergized.

If for example, if it is desired to display or illuminate a diagonal line in the matrix 80, passing through the coordinates X1-Y1, X2-Y2, X3-Y3, X4-Y4, X5-Y5, the switches 98 and 92 corresponding to these coordinates will be closed.

The display, produced by the now-energized line on matrix 80 will remain ON indefinitely, at 100 percent duty cycle until the excitation voltage $E_{AC}$ is removed. The display memory is non-volatile — i.e., it does not require any sustaining voltage or current to maintain the associated metal oxide switching devices in their conductive modes — so that whenever the excitation voltage $E_{AC}$ is removed and subsequently restored, the exact display pattern will reappear. This on-off cycle may be repeated indefinitely.

To reset matrix 80 all of the switches 92 and 98 are closed, and switch 99 is momentarily moved into engagement with terminal 100. This applies a DC pulse from the battery 94 to the MOSE devices in the panel to return them to their open or high impedance modes.

Figure 14:
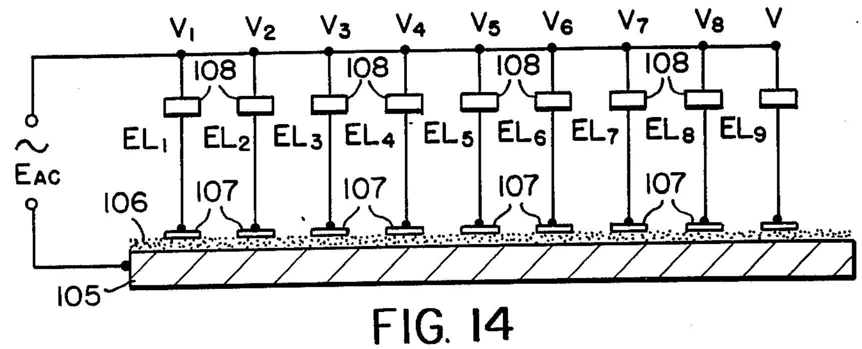
FIG. 14 illustrates diagrammatically and in section a sequential switching device made according to still another embodiment of this invention.

FIG. 14 illustrates a voltage-controlled sequential switch made according to one embodiment of the invention and comprising an anodized aluminum strip 105 having on one face an aluminum oxide ($Al_2O_3$) film 106. Mounted on top of strip 105 on film 106 is a plurality of spaced, metal electrodes 107, which are arranged in a line extending between opposite ends of strip 105. Each electrode 107 is connected to a separate electroluminescent lamp 108, which, in turn, is connected to one side of an alternating current voltage supply $E_{AC}$. The opposite side of supply $E_{AC}$ is connected to strip 105.

The aluminum oxide film 106 is applied to strip 105 in the form of a wedge having a thickness which increases slightly progressively from one end to the other strip 105, so that the threshold voltage for each successive electrode 107 in the line thereof, starting from the left end in FIG. 14, increases gradually. As the amplitude of $E_{AC}$ is increased, the lamps 108 will be energized successively from the left to right. At $V_1$ level lamp $EL_1$ will light. At $V_3$ level lamps $EL_1$, $EL_2$ and $EL_3$ will light, etc. If all the lamps are identical, they will glow with the same intensity. Moreover, if the amplitude of the excitation voltage $E_{AC}$ is lowered, the lamps will dim at the same rate.

Figure 15:
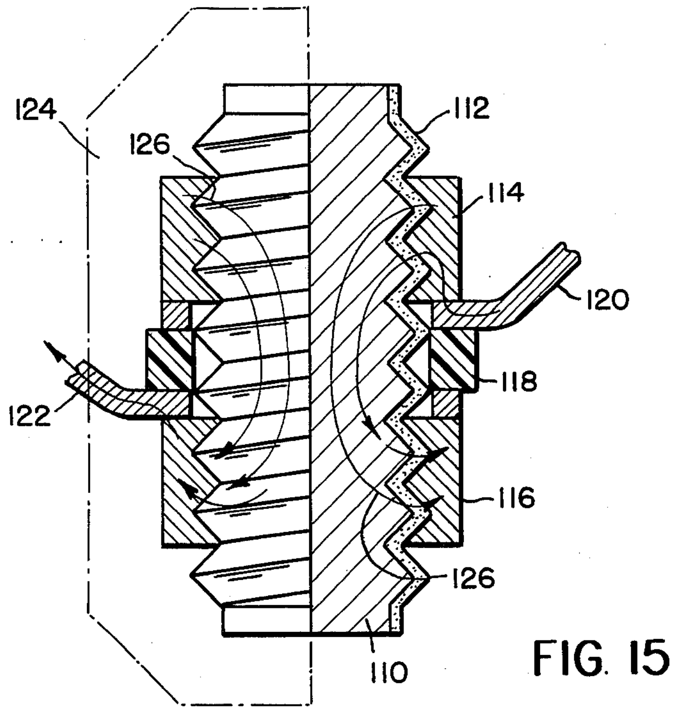
FIG. 15 is an axial sectional view, partly broken away, showing a still further modification of the invention.
Figure 16:
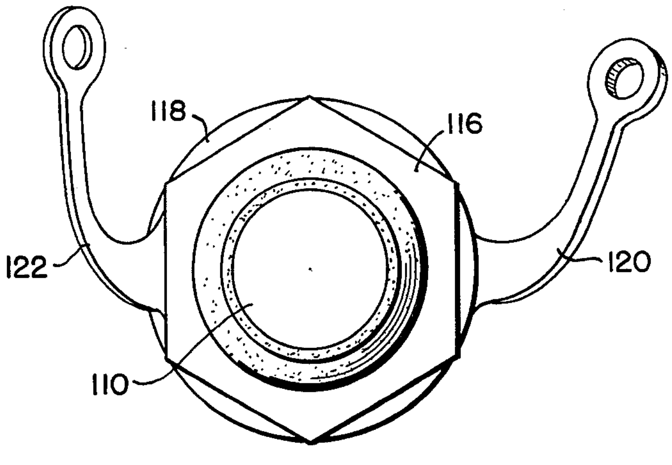
FIG. 16 is a section through this embodiment taken at right angles to FIG. 15.

The embodiment of the invention shown in FIG. 15 and 16 is similar in operation to that illustrated in FIG. 3. In FIGS. 15 and 16, however, the core member 110 is the form of an externally threaded anodized aluminum stud 110 whose aluminum oxide coating is denoted at 112. Threaded on this stud are two metal electrically-conducting nuts 114 and 116 which have contact with the aluminum oxide film 112. Between these nuts is an insulating lock washer and spacer 118; and the nute with the lock washer serve to clamp in place the two electric leads 120 and 122. The whole is encapulated in a dielectric molded shell 124.

Assuming that the current flow is from the conductive lead 120, the current flow path is as shown by arrows 126 from lead 120 to nut 114 and from nut 114 through film 112, core 110 and nut 116 out through conductive lead 122. The operation is, as stated, similar to that of the construction shown in FIG. 3. Mechanically, however, there is a difference. Pressure contact in FIGS. 15 and 16 is made between conductor 120 to oxide film 112 and from oxide film 112 to conductor 122. In this MOSE structure, when the contact nuts 114 and 116 are tightened against the insulating spacer 118, pressure is brought to bear against the contiguous oxide areas of the film 112; and, as in the FIG. 3 construction, the current in the MOSE of FIGS. 15 and 16 traverses, in effect, two layers of oxide, viz., one in contact with nut 114 and the other in contact with nut 116.

From the foregoing it will be apparent that the instant invention provides extremely simple and inexpensive means for producing bistable latching switches of the semi-conductor variety. As compared to prior such switches, the metal oxide switching elements disclosed herein are capable of handling substantially greater current and voltage loads, and can be readily fabricated into various practical memory and/or readout devices. A very important advantage also is that these metal oxide switching elements provide non-volatile memory capabilities, which means that such switches can be placed selectively in either conductive or non-conductive mode, and will remain permanently in either mode without the need for maintaining an exciting current or voltage thereacross. Depending upon the thickness of a metal oxide layer, and the overall contact area between the two electrodes of a switch of this type, voltage of predetermined amplitude must be applied across the electrodes to effect a change of state in the switch — e.g. an AC signal to close the switch, and a DC signal to open it.

The simplest and least expensive way to fabricate a metal oxide switch of this type is to anodize an aluminum surface and apply the other or counter electrode contact by lamination or molding. An infinite range of voltage and currents may be handled by such switch elements by controlling the contact area by electrodes, and the thickness of the intervening oxide layer. The actual oxide film can be produced on an electrode by, for example, anodizing an aluminum, or the like, conductor, depositing a thin film of aluminum by vacuum on a conductor and thermally oxidizing the aluminum to produce the film thereon, or by cathode sputtering aluminum onto a conductor in an oxidizing atmosphere.

These metal oxide switching elements can be employed as inexpensive switching and storage elements in a host of electronics product areas; for instance, for X-Y coordinate random access displays including not only those using EL, but also those employing liquid crystals and plasmas, for alphanumeric and other electronic readouts, with non-destructive memory, for high-density, non-volatile computer memory planes, with optional optical readout, for voltage-controlled, sequential switching circuits for linear arrays, with a large number of switches in one string, for electronic threshold fault indicators, with which events above a set threshold will be detected and remembered, etc.

The solid state metal oxide switching element (MOSE) can be fabricated inexpensively in quantity from common commercially available materials, such as aluminum, and can be made to operate over a wide range of currents and voltages.

Furthermore, while the invention has been described particularly in connection with an anodized aluminum element, it will be understood that other metals such as barium, gallium, indium, and thallium may be oxide film coated to be used as MOSE.

While the invention has been described herein in connection with specific embodiments thereof and specific uses therefor, it will be apparent that it is capable of further modification and uses, and that this application is intended to cover any embodiments and uses of the invention that come within the scope of the invention or the recital of the appended claims.

Having thus described my invention, what I claim is:

1. An electrical switching circuit, comprising an aluminum element having thereon an aluminum oxide film normally having a high resistance to current flow, a plurality of spaced electrodes mounted at the side of said film opposite said aluminum element, means for connecting said aluminum element and a selected one of said electrodes across a pulsating voltage supply, said film changing its resistance, when said pulsating voltage reaches a predetermined value above zero, from a high to a low value only in the area thereof which is in contact with said selected electrode, and means for applying a reset voltage between said element and said selected electrode to switch said selected area of said film back from said low to said high value of resistance when said pulsating voltage falls below said predetermined value, said selected area of said film remaining in its low resistance mode, regardless of the value of said pulsating voltage, until switched back to its high resistance mode by said reset voltage, and said connecting means comprising an electrical conductor connected to said pulsating voltage supply and having one end confronting the oxide film on said element and positioned to register selectively with said electrodes, and means for effecting relative movement between said element and said conductor selectively to cause said one end of said conductor to register with a selected electrode to apply the pulsating voltage thereacross.

2. An electrical switching circuit as defined in claim 1, wherein said film increases slightly in thickness from one end to the other of said element, and said electrodes are arranged in a line extending between opposite ends of said element.

3. An electrical switching circuit as defined in claim 1, wherein said probe comprises a light pipe having on said operating end thereof a transparent, electrically conductive plate connected to said voltage supply.

4. An electrical switching circuit as defined in claim 1, wherein said electrodes comprise a plurality of metal grids seated on said film above said element and coated with electroluminescent material, and said connecting means connects said pulsating voltage across one of said grids and said element to cause said electroluminescent material on said one grid to luminesce, when said one grid and said element have been switched to their conductive modes relative to each other by said pulsating voltage.

5. An electrical switching circuit, comprising an electrically conductive element having an oxide film on at least one surface thereof, a plurality of spaced electrodes in contact with spaced portions of said oxide film normally to be maintained thereby in a non-conductive mode relative to said element, an electrical load, means for connecting said load and said element in a series circuit selectively with one of said spaced electrodes across an alternating current power source, the AC voltage from said source being operative, upon reaching a predetermined threshold value, to cause only said element and the selected one of said spaced electrodes to be switched to electrically conductive modes relative to each other to allow current flow in said circuit, said element and said selected electrode being operative thereafter to remain in conductive modes until a direct current voltage is applied thereacross, and means operable when said AC current power source is disconnected from said circuit, to apply a DC signal across said element and said selected electrode to switch the element and electrode back to their non-conductive modes, said conductive element comprising one of a plurality of anodized aluminum strips disposed parallel to each other in a common plane, a metal grid coated with electroluminescent material positioned above said strips, a plurality of spaced, electrically conductive back electrodes secured in spaced rows and columns beneath said grid with each column thereof electrically connected with the oxide film on one of said strips, means including a second plurality of said strips extending beneath and at right angles to the first-named plurality of strips to register with said rows of back electrodes, means for applying said AC threshold voltage across said gqid and said strips selectively at intersections of said first and second-named pluralities of strips selectively to place said back electrodes in conductive relation to the registering portions of said strips, and means for applying an exciting AC voltage across said grid and second plurality of strips to illuminate the portions of said electroluminescent material that register with the selected back electrodes.

* * * * *